United States Patent Office 3,114,624
Patented Dec. 17, 1963

3,114,624
GRANULAR N-K AND N FERTILIZERS FROM NITROGEN SOLUTIONS
Joseph A. Smith, Richmond, and George R. Gilliam, Hopewell, Va., assignors to Allied Chemical Corporation, New York, N.Y., a corporation of New York
No Drawing. Filed Aug. 20, 1959, Ser. No. 834,947
6 Claims. (Cl. 71—64)

This invention relates to the production of granular fertilizers or more particularly to the production of granular nitrogen-potassium and nitrogen fertilizers from nitrogen solutions.

Over the past years there has been a steady rise in the average quantity of nitrogen incorporated in chemical fertilizers, and many studies have been made on increasing the proportion of nitrogen in solid mixed fertilizers that can be derived from nitrogen solutions. Experimental work has been centered on concentrated solutions of ammonia, ammonium nitrate and water containing 37 to 49% N, since these solutions are generally the most economical source of nitrogen readily available. However, studies have for the most part been concerned with mixtures including normal or triple superphosphate and the techniques developed are not applicable when it is desired to make products without phosphate from these low cost nitrogen solutions. When attempts have been made to use nitrogen solutions for the preparation of solid nitrogen-potassium or solid nitrogen products, processing difficulties have been encountered such as the formation of mud-like materials which are difficult to dry.

Up to the present time no solid nitrogen-potassium or nitrogen product has been made containing over 10% nitrogen supplied by a nitrogen solution.

It is therefore an object of this invention to provide a process which will permit the manufacture of fertilizers containing large amounts of nitrogen in which all the nitrogen can be supplied from a nitrogen solution, such as 12%–28% nitrogen.

It is a further object of this invention to provide a commercial process for the manufacture of solid nitrogen containing fertilizers from commercially available nitrogen solutions.

It has been found that these objects and other advantages incidental thereto can be attained if the commercial nitrogen solutions are admixed with sulfuric acid at a controlled rate to produce a slurry having a water content of about 4–14%, a pH within the range of 1.8 to 2.9, while maintaining the temperature within the range of 125–160° C., mixing slurry so produced with dry material of sufficient alkalinity to neutralize the small quantity of free acid in the slurry while cooling it to a temperature below 100° C. and bring its water content to within the range of 1.5 to 3.5% and subsequently drying the resultant mixture to a moisture content of not above 1%.

In accordance with a preferred process of this invention a nitrogen solution (containing ammonia, ammonium nitrate and water) is fed continuously with sulfuric acid and water into a tank equipped with an agitator. A continuous overflow is withdrawn from the tank to maintain a constant level and water is permitted to evaporate freely at about atmospheric pressure to dissipate the heat of reaction of the ammonia solution and acid. Water addition is used as a control, i.e., water is added to control the temperature of the reaction mixture by evaporation. It is important to control the ratio of acid to nitrogen solution to give a slurry pH of 1.8 to 2.9, and it is preferred to operate within a pH range of 2.0 to 2.6. At higher pH's some ammonia is lost during the neutralization and equally important the solubility of the salts decreases and problems are encountered in handling the slurry at the low water contents needed in the process. At lower pH's excessive free acid is present which may lead to poor granulation in the following step and also represents an economic loss since the excess acid increases the raw material costs unnecessarily. The broad pH range of 1.8 to 2.9 corresponds to free acid contents in the overflow slurry of about 4.5% to 0.5% by weight (calculated as sulfuric acid). Temperature control is very critical in this reaction. A maximum range of about 125 to 160° C. can be used, but it is preferable to operate at temperatures of 135 to 150° C. At temperatures above 160° C. loss of nitrogen occurs and also the high temperatures interfere with satisfactory blending of the slurry with the dry materials in the following step. At the lower temperatures the water content of the slurry is high and below about 125° C. this leads to excessive agglomeration or formation of mud in the mixer. Within the preferred temperature range water contents of about 4 to 10% by weight are obtained. If the pH is also within the given ranges, the slurry, even with only 4% water, will be quite fluid and no difficulty will be had in transferring it through pipe as small as one-half inch diameter. It is convenient to use concentrated nitrogen solutions (37 to 49% N) and concentrated sulfuric acid (80 to 94% $H_2SO_4$) in this step of the process, allowing the heat of reaction to freely evaporate water and adding sufficient additional water to maintain the desired temperature. However, more dilute acid or nitrogen solution could be used to decrease or eliminate the need for water being added to the mixing tank.

The slurry overflowing the tank is introduced to a mixer such as a pug mill, continuous ribbon mixer or TVA ammoniator where it is cooled below 100° C., preferably below 90° C. by blending with the other materials in the formulation and recycled previously dried product. In all cases enough ground limestone or dolomite is included in the formulation to neutralize the small quantity of free acid in the slurry. No problems with foaming from gas liberation or excessive temperature rise occur as a result of this neutralization with slurry in the above indicated pH range. Potash bearing materials such as muriate of potash or sulfate of potash are introduced into the mixer together with the dolomite to obtain ratios of N to $K_2O$ ranging from 1:0 to 1:2.

It is entirely feasible to obtain all the nitrogen from a solution but there may be instances when it would be desirable to add to the mixer a particular type of nitrogen in solid form. For example, a quantity of sodium nitrate could be added to increase the proportion of nitrate nitrogen, or a ureaform product could be added to supply some slowly available nitrogen. The quantities of dolomite and potassium containing solids added to the mixer may be varied to give a range of products containing from about 12 to 28% nitrogen, and 0 to 24% $K_2O$ but the mixture of slurry and solids must be maintained at a water content within the range 1.5 to 3.5% and preferably at 1.8 to 2.5% to obtain acceptable granulation. At higher moisture contents a mud is formed in the mixer and at lower water content nonuniform wetting of the solid materials by the slurry occurs leading to a nonhomogeneous product. To obtain the desired water content it is necessary under most conditions to recycle a portion of the previously dried product and to blend this recycle with the slurry and the added solid raw material.

The material from the mixer may be dried by conventional means. Typically, material from the mixer is passed through direct-fired rotary drum driers in which its moisture content is reduced to less than 1%. The heating gas typically passes through the drier co-currently to the fertilizer, so that at the inlet end of the drier temperatures of 200–350° C. are maintained. The dried material is preferably screened to obtain product of the desired particle size. The off-size material and as much of the product size material as may be necessary to provide the desired recycle ratio is recycled as the dried product which is fed to the mixer.

*Example 1*

The following example demonstrates the preparation of a 14–0–14 fertilizer by operation within the preferred limits of the process. A nitrogen solution containing 72.5% ammonium nitrate, 19% free ammonia and 8.5% water was fed into the bottom of a seven gallon, open, agitated tank at a rate of 205 pounds per hours. Simultaneously, 66° Bé. sulfuric acid analyzing 93.8% $H_2SO_4$ was fed into the tank to maintain a pH of 2.0 to 2.1; a rate of approximately 121 pounds/hour of acid was required. The heat of reaction of ammonia and acid raised the mixture temperature and water was added at a rate to maintain the temperature at 145° C. Under these conditions the slurry in the tank was quite fluid and the overflow from the tank contained about 6% water, and 1% free acid by weight as $H_2SO_4$. Analysis of this slurry showed no significant loss of ammoniacal nitrogen to occur during the reaction. The overflow from the tank was fed to a pug mill into which the following solid materials were also fed: 140 lbs./hr. of muriate of potash containing 60% $K_2O$; 151 lbs./hr. of crushed dolomite, and 360 lbs./hr. of previously dried product chiefly of –30 mesh size. The pug mill continuously discharged this mixture at a temperature of about 85° C. at a pH of about 6.5, and a moisture content of 2.1%, to a gas fired rotary drier in which it was dried to about 0.5% water. The product was cooled and screened. Material larger than 6 mesh Tyler was put through a hammer mill and returned to the screen. Material smaller than 30 mesh Tyler plus small quantities, as needed, of 6 to 30 mesh product was returned to the pug mill to maintain the desired recycle rate of 360 pounds/hr. The remainder of the 6 to 30 mesh material amounting to about 590 pounds/hr. was removed as product. Analysis of the product showed 14.24% N, 14.53% $K_2O$ and 0.49% $H_2O$. It was in the form of hard granules of homogeneous composition.

*Example 2*

The following example shows the effect of pH and temperature during the reaction of nitrogen solution and sulfuric acid. The same raw materials and equipment used for Example 1 were used in this experiment. The nitrogen solution was fed to the tank at a rate of 228 pounds/hr. and the sulfuric acid was fed at an initial rate of about 135 pounds/hr. During the experiment the acid rate was varied to give slurry pH's of 1.7 to 2.7. At the lower pH's corresponding to free acid contents greater than about 5 wt. % of the mix, granulation of the product was notably poorer. At a pH of 2.7 about 2% of the ammoniacal nitrogen was lost, even when slurry temperature was reduced to as low as 125° C., at which temperature the slurry showed signs of thickening. For most of the experiment a pH range of 2.0 to 2.6 was maintained and free acid content was found to be about 1% of slurry weight and no significant nitrogen loss was sustained. By varying the quantity of water added to the tank the slurry temperature during the experiment was varied from 125° C. to 145° C. It was fluid throughout this range. At 145° C. the slurry had a water content of 6.6% while at 125° C. the water content was 13.7%. The slurry was fed to a pug mill together with 78 pounds per hour of muriate of potash, 165 pounds per hour of dolomite, and varying amounts of recycled previously dried material sufficient to give a water content of about 2.5% in the discharge from the pug mill. When the slurry contained 6.6% water about 430 pounds per hour of recycle was used and when it contained 13.7% water approximately 1860 pounds per hour of recycle was needed. The wet material from the pug mill was dried, cooled, screened, and oversized crushed as in Example 1. Material smaller than 30 mesh plus some 6–30 mesh material was recycled to the pug mill. Product was 6–30 mesh. About 575 pounds per hour of a 16–0–8 granular fertilizer was thus produced.

*Example 3*

The following example demonstrates the preparation of a fertilizer containing no potassium. A nitrogen solution with composition of 16.6% free ammonia, 66.8% ammonium nitrate, and 16.6% water was fed at a rate of 230 pounds per hour to a 10 gallon agitated tank equipped with an overflow line. Sulfuric acid analyzing 93% $H_2SO_4$ was fed to the tank at a rate of 119.5 pounds per hour to maintain a reaction pH of 2.0 to 2.4. Sufficient water was added to the tank to maintain the slurry at a temperature of 150° C. No significant quantities of acid or ammonia could be detected in the vapors from the tank. Slurry overflowing from the tank contained about 1% free acid, as sulfuric acid, and about 4.3% water. This slurry was fed to a pug mill together with 99 pounds per hour of crushed limestone and about 600 pounds per hours of recycled dried product material. The pug mill discharge contained about 2% water and was at a temperature of about 90° C. It was dried in a rotary drier, cooled, and screened. All material larger than 6 mesh Tyler was crushed and rescreened. Material in the size range of 6 to 30 mesh was withdrawn as product at a rate of 400 pounds per hour. The remainder of this size material was combined with the material smaller than 30 mesh produced and returned as recycle to the pug mill. Product was a granular 21–0–0 fertilizer with actual analysis of 21.2% N and 0.4% $H_2O$.

Although certain preferred embodiments of the invention have been disclosed for purpose of illustration, it will be evident that various changes and modifications may be made therein without departing from the scope and spirit of the invention.

We claim:

1. The process for the preparation of a granular fertilizer containing large amounts of nitrogen in the range of 12% and up from concentrated nitrogen solution comprising feeding a concentrated nitrogen solution comprising water, ammonia and ammonium nitrate and separately and simultaneously feeding concentrated sulfuric acid into a chamber provided with an agitator, the ratio of acid to nitrogen solution being controlled to maintain a resultant slurry pH of 1.8 to 2.9 and the amount of water being controlled to produce a slurry having a water content of 4–14% and a temperature within the range of 125° to 160° C., removing slurry from said chamber, feeding said slurry to a mixer where it is cooled to a temperature below 100° C. and blended with an amount of substantially dry solids which brings the water content of the mixture of slurry and solids in the range between 1.5% and 3.5%, said solids containing at least sufficient alkaline earth carbonate of the group consisting of calcium carbonate and magnesium carbonate to neutralize the free acid in the slurry, and drying to moisture content not above 1%.

2. The process for the preparation of a granular fertilizer containing large amounts of nitrogen in the range of 12% and up from concentrated nitrogen solution comprising continuously feeding a concentrated nitrogen solution comprising water, ammonia and ammonium nitrate and separately and simultaneously feeding concentrated sulfuric acid into a chamber provided with an agitator, the ratio of acid to nitrogen solution being controlled to maintain a resultant slurry pH of 1.8–2.9 and the amount of water being controlled to produce a slurry having a water content of about 4–10% and a temperature within the range of 135° to 150° C., continuously removing the slurry from said chamber, feeding said slurry to a mixer where it is cooled to a temperature below 100° C. and blended with an amount of substantially dry solids which brings the water content of the mixture of slurry and solids in the range between 1.5% and 3.5%, said solids containing at least sufficient alkaline earth carbonate of the group consisting of calcium carbonate and magnesium carbonate to neutralize the free acid in the slurry, and drying to moisture content not above 1%.

3. The process for the preparation of a granular fertilizer containing large amounts of nitrogen in the range of 12% and up from concentrated nitrogen solution comprising feeding a concentrated nitrogen solution comprising water, ammonia and ammonium nitrate and separately and simultaneously feeding concentrated sulfuric acid and feeding water into a tank open to the atmosphere and provided with an agitator, to form a mixed slurry, the ratio of said acid to nitrogen solution being controlled to maintain a resultant slurry having a pH of 1.8 to 2.9 and the amount of water being controlled to give a slurry having a water content of 4–14%, maintaining the temperature of the reaction mixture by evaporation within the range of 125° to 160° C., continuously removing said slurry from said tank, feeding said slurry to a mixer where it is cooled to a temperature below 100° C. and blended with an amount of substantially dry solids which brings the water content of the mixture of slurry and solids in the range between 1.5% and 3.5%, said solids containing recycled product of the final drying step below recited and at least sufficient alkaline earth carbonate of the group consisting of calcium carbonate and magnesium carbonate to neutralize the free acid in the slurry and drying to a moisture content not above 1%.

4. The process for the preparation of a granular fertilizer containing large amounts of nitrogen in the range of 12% and up from concentrated nitrogen solution comprising continuously feeding concentrated sulfuric acid and feeding water and separately and continuously feeding a concentrated nitrogen solution containing ammonia, ammonium nitrate and water into a chamber provided with an agitator, the ratio of acid to nitrogen solution being controlled to maintain resultant slurry having a pH of 1.8 to 2.9 and the amount of water being controlled to maintain a slurry having a water content of about 4–10% at a temperature of 125°–150° C., removing slurry from said chamber, feeding said slurry to a mixer where it is cooled to a temperature below 100° C. and blended with an amount of substantially dry solids which brings the water content of the mixture of slurry and solids in the range between 1.8% and 2.5%, said solids containing recycled product of the final drying step below recited and at least sufficient alkaline earth carbonate of the group consisting of calcium carbonate and magnesium carbonate, to neutralize the free acid in the slurry, and drying to a moisture content not above 1%.

5. The process for the preparation of a granular fertilizer containing large amounts of nitrogen in the range of 12% and up from concentrated nitrogen solution containing ammonia, ammonium nitrate and water comprising continuously feeding a concentrated nitrogen solution, and separately and continuously feeding concentrated sulfuric acid and feeding water into a tank open to the atmosphere and provided with an agitator, the ratio of acid to nitrogen solution being controlled to maintain a resultant slurry having a pH of 2.0 to 2.6 and the amount of water added being controlled to maintain a slurry having a water content of 4–10%, maintaining the temperature of the reaction mixture by evaporation within the range of 135°–150° C., removing slurry from said tank, feeding said slurry to a mixer where it is cooled to a temperature below 100° C. and blended with an amount of substantially dry solids which brings the water content of the mixture of slurry and solids in the range between 1.8% and 2.5%, said solids containing recycled product of the final drying step below recited and at least sufficient alkaline earth carbonate of the group consisting of calcium carbonate and magnesium carbonate to neutralize the free acid in the slurry and drying to a moisture content not above 1%.

6. The process of claim 1 in which the solids with which said slurry is mixed contain potash-bearing materials in an amount not more than the give a 1:2 ratio of nitrogen to $K_2O$.

References Cited in the file of this patent

UNITED STATES PATENTS

| | | |
|---|---|---|
| 2,140,340 | Vogel | Dec. 13, 1938 |
| 2,762,699 | Steinle et al. | Sept. 11, 1956 |
| 2,781,254 | Munekata et al. | Feb. 12, 1957 |
| 2,902,342 | Kerley | Sept. 1, 1959 |
| 2,976,126 | Seymour | Mar. 21, 1961 |
| 2,999,015 | Mortenson et al. | Sept. 5, 1961 |